(12) United States Patent
El-Mahdy et al.

(10) Patent No.: US 10,810,125 B2
(45) Date of Patent: *Oct. 20, 2020

(54) PREFETCHING DATA

(71) Applicant: International Business Machines Corporation, Armonk, NY (US)

(72) Inventors: Ahmed H. El-Mahdy, Alexandria (EG); Hisham Emadeldin ElShishiny, Cairo (EG)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 698 days.

This patent is subject to a terminal disclaimer.

(21) Appl. No.: 15/049,830

(22) Filed: Feb. 22, 2016

(65) Prior Publication Data

US 2016/0246725 A1 Aug. 25, 2016

Related U.S. Application Data

(63) Continuation of application No. 12/335,077, filed on Dec. 15, 2008, now Pat. No. 9,274,965.

(51) Int. Cl.
*G06F 12/0862* (2016.01)
(52) U.S. Cl.
CPC .. *G06F 12/0862* (2013.01); *G06F 2212/6026* (2013.01); *G06F 2212/6028* (2013.01)
(58) Field of Classification Search
CPC ......... G06F 12/0862; G06F 2212/6028; G06F 2212/6026
See application file for complete search history.

(56) References Cited

U.S. PATENT DOCUMENTS

| 5,537,573 A | 7/1996 | Ware et al. |
| 5,790,823 A | 8/1998 | Puzak et al. |

(Continued)

FOREIGN PATENT DOCUMENTS

| CN | 101751246 A | 6/2010 |
| EP | 1576465 A1 | 9/2005 |

(Continued)

OTHER PUBLICATIONS

Tucker, D.F. et al., "Hardware and Software Cache Prefetching Techniques for MPEG Benchmarks," in IEEE Transactions on Circuits and Systems for Video Technology, Aug. 2000, vol. 10, No. 5, pp. 782-796.

(Continued)

*Primary Examiner* — Larry T MacKall
(74) *Attorney, Agent, or Firm* — Cuenot, Forsythe & Kim, LLC

(57) ABSTRACT

A prefetch controller is configured to communicate with a prefetch cache in order to increase system performance. The prefetch controller includes an instruction lookup table (ILT) configured to receive a first tuple including a first instruction ID and a first missed data address. The prefetch controller further includes a tuple history queue (THQ) configured to receive an instruction/stride tuple, the instruction/stride tuple generated by subtracting a last data access address from the first missed data address. The prefetch controller further includes a sequence prediction table (SPT) in communication with the tuple history queue (THQ) and the instruction lookup table. The prefetch controller includes an adder in communication with the instruction lookup table (ILT) and the sequence prediction table (SPT) configured to generate a predicted prefetch address and to provide the predicted prefetch address to a prefetch cache.

20 Claims, 7 Drawing Sheets

(56) References Cited

U.S. PATENT DOCUMENTS

| | | | |
|---|---|---|---|
| 5,941,981 A | 8/1999 | Tran | |
| 6,134,632 A | 10/2000 | Kedem et al. | |
| 6,138,213 A * | 10/2000 | McMinn | G06F 12/0862 |
| | | | 711/118 |
| 7,076,619 B2 | 7/2006 | Hsu et al. | |
| 7,200,719 B2 | 4/2007 | Moyer et al. | |
| 9,274,965 B2 | 3/2016 | El-Mahdy et al. | |
| 2005/0076181 A1 | 4/2005 | Hsu | |
| 2006/0294316 A1 | 12/2006 | Ho | |
| 2007/0288697 A1 | 12/2007 | Keltcher | |
| 2010/0153653 A1 | 6/2010 | El-Mahdy et al. | |

FOREIGN PATENT DOCUMENTS

| | | |
|---|---|---|
| TW | I258078 B | 7/2006 |
| TW | I285839 B | 8/2007 |
| TW | 200821925 A | 5/2008 |
| TW | 201032130 A | 9/2010 |
| WO | 2004053686 A1 | 6/2004 |

OTHER PUBLICATIONS

Sbeyti, H. et al., "Pattern-Driven Prefetching for Multimedia Applications on Embedded Processors," Journal of Systems Architecture, Apr. 30, 2006, vol. 52, No. 4, pp. 199-212.

U.S. Appl. No. 12/335,077, Non-Final Office Action, dated Jul. 27, 2011, 12 pg.

U.S. Appl. No. 12/335,077, Final Office Action, dated Feb. 3, 2012, 13 pg.

U.S. Appl. No. 12/335,077, Examiner's Answer, dated Sep. 14, 2012, 14 pg.

U.S. Appl. No. 12/335,077, Patent Board Decision on Appeal, dated Aug. 24, 2015, 8 pg.

U.S. Appl. No. 12/335,077, Notice of Allowance, dated Nov. 6, 2015, 7 pg.

* cited by examiner

PREFETCHING DATA

TECHNICAL FIELD

This disclosure relates to a system and method for prefetching data. More specifically, this disclosure provides a prefetching controller configured to dynamically learn and subsequently predict an upcoming processor request.

BACKGROUND

In existing systems, the performance of high-speed computers is limited by memory latency, as memory access time may be much greater than processor cycle time. Memory and processor latencies are diverting at an exponential rate, creating the infamous memory-processor gap. This increasing gap may act as a potential performance bottleneck, severely limiting maximum theoretical performance in current and future computer systems. Moreover, the current mainstream multi-core processors increase memory contention, further affecting effective per core memory latency.

Specifically, memory intensive applications such as multimedia and streaming applications tend to be largely affected by the growing memory-processor performance gap. Such applications may often require real-time or high speed computation.

Memory and processing bandwidths are similar and relatively easy to co-scale well. For example, existing multi-core processors have high memory bandwidth using channels and banks. Known solutions to the latency gap rely on using memory bandwidth to 'hide' memory latency as well as exploiting locality of references.

Some of these solutions may include using caches, or more generally memory hierarchy, to utilize locality of reference inherent in instruction and data accesses. Caches filter a significant number of memory accesses, resulting in small effective memory latency.

Other solutions may involve using hardware multithreading to hide memory latency by context switching to another thread, thereby overlapping execution bandwidth with memory bandwidth. That effectively decreases the effect of memory latency significantly to the overall system performance.

Another solution may involve using data prefetching. In this case, data may be prefetched well before it is demanded. Some existing prefetching techniques may include hardware methods that rely on prefetching streams of data (using fixed strides). Examples include 'one-block-ahead' for prefetching cache lines, and stream buffers[Zucker, D. F.; Lee, R. B.; Flynn, M. J., "Hardware and software cache prefetching techniques for MPEG benchmarks," Circuits and Systems for Video Technology, IEEE Transactions on, vol. 10, no. 5, pp. 782-796, August 2000]. Other prefetching techniques may include the use of a stride prediction table. Generally, this refers to a hardware method where the last instruction and its associated data reference address are stored in a table; a subsequent access to the same instruction would trigger prefetching; current and last data access addresses predicts the prefetch address [Zucker, D. F.; Lee, R. B.; Flynn, M. J., "Hardware and software cache prefetching techniques for MPEG benchmarks, "Circuits and Systems for Video Technology, IEEE Transactions on, vol. 10, no. 5, pp. 782-796, August 2000]. [HOOGERBRUGGE JAN [US]; VAN DE WAERDT JAN-WILLEM[US] "COUNTER BASED STRIDE PREDICTION FOR DATA PREFETCH", EP1576465 (A1)]. Another prefetching technique may involve pattern-driven-prefetching. Here, the hardware may detect a stride pattern in a data reference sequence. The obtained pattern may direct the next prefetch addresses [Sbeyti, H., Niar, S., and Eeckhout, L. 2006. Pattern-driven prefetching for multimedia applications on embedded processors. J. Syst. Archit. 52, 4 (April 2006), 199-212 DOI=http://dx.doi.org/10.1016/j.sysarc.2005.05.002]. Additional prefetching techniques may include the use of explicit memory management. In this technique, the programmer manages memory by software, scheduling filling/spilling of data buffers (such as DMA transfers in the Cell BE processor).

However, none of the prefetch techniques described above allow for generic pattern matching. Some techniques only allow for simple stride prediction that is useful only for a limited set of applications. Other techniques are only capable of matching sequences of very small lengths (e.g., up to 3). As such, further work is thus needed to improve existing prefetching techniques to make them applicable to a wider class of applications, and to use the abundant bandwidths available (especially in multicore processors) to hide memory latency.

SUMMARY OF DISCLOSURE

In a first implementation, a system may include a data cache configured to store at least one instruction and a processor operatively connected to the data cache, the processor configured to execute the at least one instruction. The system may further include a prefetch controller operatively connected with the data cache, the prefetch controller configured to receive a first tuple including a first instruction ID and a first missed data address. The prefetch controller may be further configured to retrieve a last data access address and to subtract the last data access address from the first missed data address to generate an instruction/stride tuple. The prefetch controller may also be configured to use the instruction/stride tuple to generate a predicted prefetch address. The system may additionally include a prefetch cache configured to receive said predicted prefetch address from said prefetch controller and to provide said predicted prefetch address to said data cache.

One or more of the following features may be included. In some embodiments, the prefetch controller may include a tuple history queue (THQ) configured to receive and store the instruction/stride tuple.

The prefetch controller may also include a sequence prediction table (SPT) configured to receive at least one of a current tuple and a current sequence from the tuple history queue (THQ).

The prefetch controller may further include an instruction lookup table configured to store a last data address accessed for each tuple and the instruction lookup table may be in communication with the sequence prediction table. In some embodiments, the sequence prediction table may be configured to search for a match for the current sequence. If a match for the current sequence is found, the sequence prediction table may be configured to increment a next tuple count. The instruction lookup table may be indexed via each tuple's instruction ID.

In some embodiments, the predicted prefetch address may be generated by adding a predicted tuple having a stride data address from the sequence prediction table with a last data address obtained from an instruction lookup table.

In another implementation a prefetch controller is provided. The prefetch controller may include an instruction lookup table (ILT) configured to receive a first tuple including a first instruction ID and a first missed data address. The prefetch controller may also include a tuple history queue (THQ) configured to receive an instruction/stride tuple, the instruction/stride tuple generated by subtracting a last data access address from the first missed data address. The prefetch controller may additionally include a sequence prediction table (SPT) in communication with the tuple history queue (THQ) and the instruction lookup table. The prefetch controller may include an adder in communication with the instruction lookup table (ILT) and the sequence prediction table (SPT), the adder being configured to generate a predicted prefetch address and to provide the predicted prefetch address to a prefetch cache.

In some embodiments, the tuple history queue (THQ) may be configured to receive and store the instruction/stride tuple and to provide access for the sequence prediction table (SPT). The sequence prediction table (SPT) may be configured to receive at least one of a current tuple and a current sequence from the tuple history queue (THQ). The instruction lookup table may be configured to store a last data address accessed for each tuple and the instruction lookup table may be in communication with the sequence prediction table. The instruction lookup table may be indexed via each tuple's instruction ID.

In some embodiments, the sequence prediction table may be further configured to search for a match for the current sequence and to increment a next tuple count if the match for the current sequence is located.

In some embodiments, the predicted prefetch address may be generated by adding a predicted tuple having a stride data address from the sequence prediction table with a last data address obtained from an instruction lookup table.

In another implementation, a method of prefetching data is included. The method may include receiving a first tuple from a data cache, the first tuple including a first instruction ID and a first missed data address at an instruction lookup table (ILT). The method may also include generating an instruction/stride tuple by subtracting a last data access address from the first missed data address. The method may additionally include receiving the instruction/stride tuple at a tuple history queue (THQ) and comparing at least one tuple from the tuple history queue with information included within a sequence prediction table (SPT). The method may further include generating a predicted prefetch address and providing the predicted prefetch address to a prefetch cache.

In some embodiments of the method, the sequence prediction table (SPT) may be configured to receive at least one of a current tuple and a current sequence from the tuple history queue (THQ). The sequence prediction table may be further configured to increment a next tuple count if the match for the current sequence is located. The method may also include generating the predicted prefetch address by adding a predicted tuple having a stride data address from the sequence prediction table with a last data address obtained from an instruction lookup table.

The details of one or more implementations are set forth in the accompanying drawings and the description below. Other features and advantages will become apparent from the description, the drawings, and the claims.

DETAILED DESCRIPTION OF THE PREFERRED EMBODIMENTS

Generally, the present disclosure relates to systems and methods for learning the behavior of a system and for predicting a future processor request. More specifically, the present disclosure describes how to model a particular data access as a tuple of the instruction address and its current data stride. In this way, the dynamic data access sequences described herein may be modelled as a sequence of instruction/stride tuples. These sequences may be used to record transition counts among tuples. As described in further detail below, predicting a future request may then be achieved by choosing the most likely tuple to occur given the history of the last 'n' tuples.

The term "tuple" as used herein may refer to a "sequence of values." In some embodiments, a tuple may be a sequence of values having a length of two (e.g., instruction address and data stride).

Figure 1:
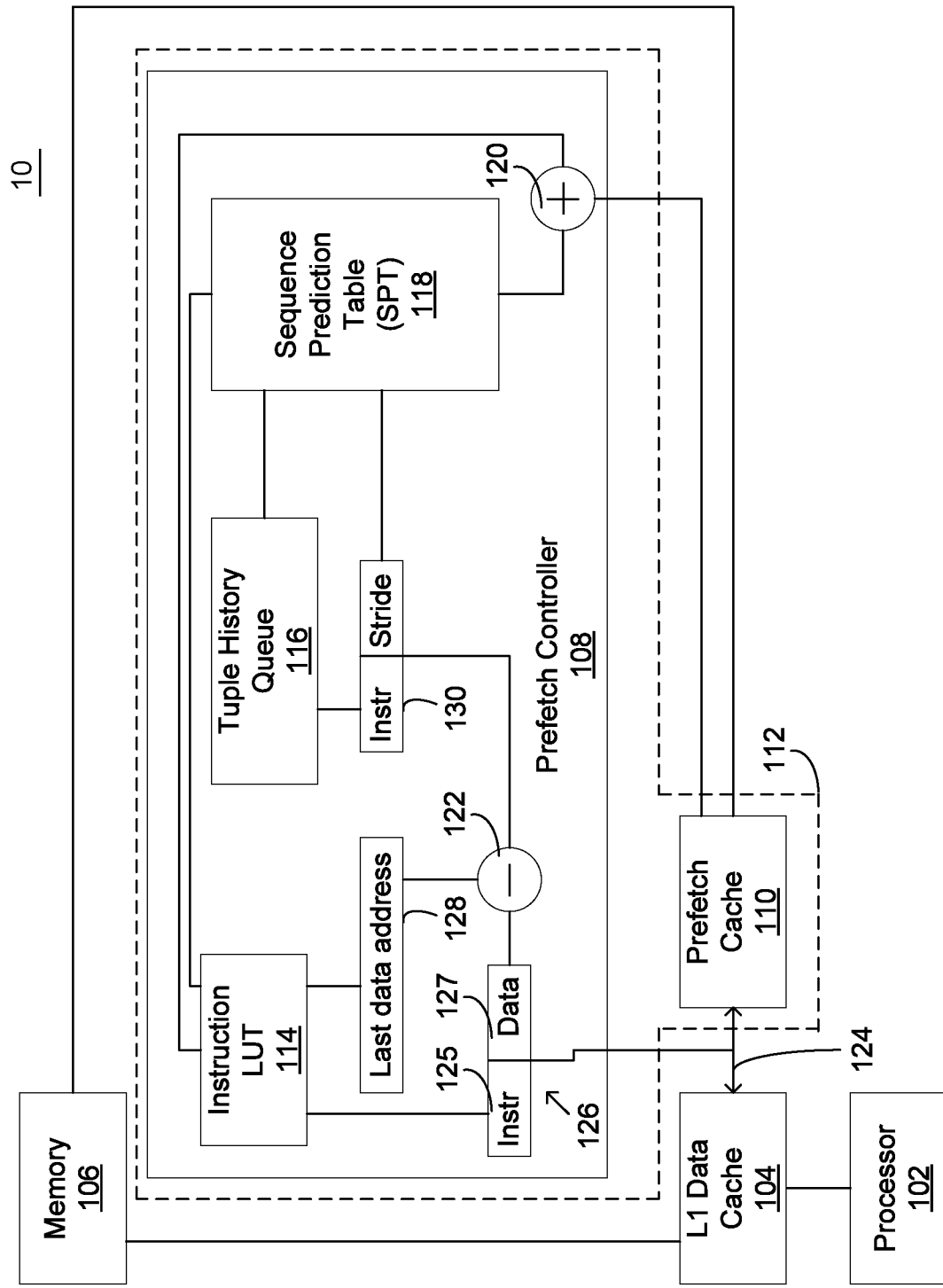
FIG. 1 is a block diagram of a system in accordance with an embodiment of the present disclosure.

Referring to FIG. 1, there is shown a prefetching system 10 in accordance with the present disclosure. System 10 may include, inter alia, processor 102, LI data cache 104, and memory 106. Processor 102 may be configured to execute instructions and to access LI data cache 104 and/or memory 106 as necessary.

Processor 102 may include any of a variety of processors, including, but not limited to those having a plurality of cores, for example an Intel® Pentium® D dual core processor. However, this processor is provided merely for exemplary purposes, and the operative circuitry described herein may be used in other processor designs and/or other multi-threaded integrated circuits.

LI data cache 104 and memory 106 may include one or more of the following types of memories: semiconductor firmware memory, programmable memory, nonvolatile memory, read-only memory, electrically programmable memory, random access memory, flash memory (which may include, for example, NAND or NOR type memory structures), magnetic disk memory, and/or optical disk memory. Either additionally or alternatively, memory may comprise other and/or later developed types of computer-readable memory. Of course, numerous other memory types are also within the scope of the present disclosure.

System 10 may further include prefetch controller 108 and prefetch cache 110. For the purposes of the present disclosure, prefetch controller 108 and prefetch cache 110 may be collectively referred to as prefetch subsystem 112. Prefetch subsystem 112 may be configured to dynamically learn, and subsequently predict, the next request from processor 102.

In some embodiments, prefetch controller 108 may include instruction lookup table (ILT) 114, tuple history queue (THQ) 116, and sequence prediction table (SPT) 118. Prefetch controller may include various additional components, including, but not limited to, adder 120 and subtractor 122.

In operation, system 10 may perform a variety of different operations depending upon whether the information desired by processor 102 is located within LI data cache 104. For example, in the event that there is not an LI data cache miss, the system 10 may behave without utilizing prefetch controller 108 and/or prefetch cache 110. However, if a data cache miss occurs, LI data cache 104 may look up the missed data in prefetch cache 110. If the data is located in prefetch cache 110 the data may be supplied to LI data cache 104, which may, in turn, supply the requested information to processor 102. This may significantly reduce any associated LI data cache miss penalty. If the data misses prefetch cache 110, a normal LI data cache miss cycle may proceed without supplying the missed data to the prefetch cache.

Thus, the activation of prefetch controller 108 may be triggered by an LI data cache miss. This activation may occur even if the LI misses hit prefetch cache 110. As such, prefetch subsystem 112 may be configured to learn and predict the normal LI data cache misses without changing data cache behavior.

Upon activation, prefetch controller 108 may be configured to snoop the missed data address from LI data cache 104 along prefetch cache bus 124. Additionally, prefetch controller 108 may also be configured to snoop the instruction id (or address) responsible for the miss. It should be noted that the Instruction ID may not be included within the processor to memory bus in existing systems. However, in accordance with the present disclosure, prefetch controller 108 may be highly coupled with processor 102 and LI data cache 104. In this way, such information may be made readily available by modifying the processor-L1 cache bus. In some embodiments, system 10 may include bus circuitry configured to provide compatibility with a variety of different bus architectures, including, but not limited to, Universal Serial Bus (USB), Serial Advanced Technology Attachment (SATA), Peripheral Component Interface (PCI), PCI-Express and System Management Bus (SMBus).

The gathered instruction ID 125 of first tuple 126, acquired through the snooping operation above, may then be applied to the Instruction Lookup Table (ILT) 114 to obtain the instruction's last data access address 128. Instruction lookup table 114 may operate in this manner to record the last data address accessed for each tuple seen. In some embodiments, instruction lookup table 114 may be indexed according to instruction ID, however, numerous other indexing methods could also be used. At this point, the current data address 127 may be used to update the looked up entry. The stride may be formed by subtracting last data access address 128 from current data address 127 using subtractor 122. The term "stride" as defined herein may refer to the relative difference between two data addresses. The calculated stride may then be used to generate instruction/stride tuple 130, which may be referred to herein as the "current tuple."

Prefetch subsystem 112 may now proceed in two phases, namely, the miss learning and the miss prediction phases. System 10 may utilize a number of different components during these phases, such as the Tuple History Queue (THQ) 116 and Sequence Prediction Table (SPT) 118. In some embodiments, Tuple History Queue 116 may be configured to hold the last 'n' seen tuples. For the purpose of this disclosure, these tuples may be referred to as the 'sequence'. The sequence and instruction/stride tuple 130 are coupled; the instruction/stride tuple 130 may be regarded as be the 'next' tuple to happen given the occurrence of the last 'n' tuples (sequence). Such conditional frequencies are recorded by Sequence Prediction Table 118.

Figure 2:
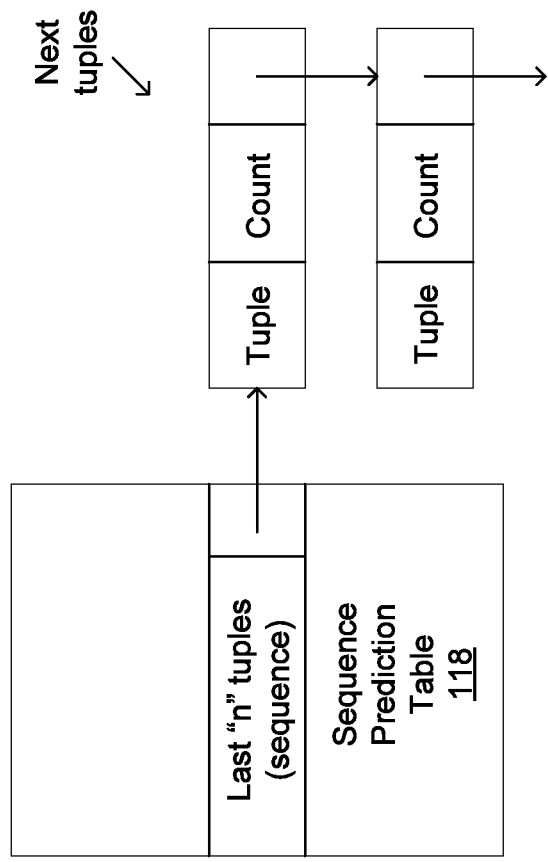
FIG. 2 is a diagram showing a sequence prediction table in accordance with an embodiment of the present disclosure.

Referring now to FIG. 2, an embodiment of Sequence Prediction Table 118 is shown in greater detail. Sequence Prediction Table 118 may contain a number of entries wherein each entry holds a sequence and a pointer to next tuples. The number of next tuples is a parameter (a reasonable value is two). Each next tuples holds a count field, recording the number of times the tuple follows sequence in the run-time.

Figure 3:
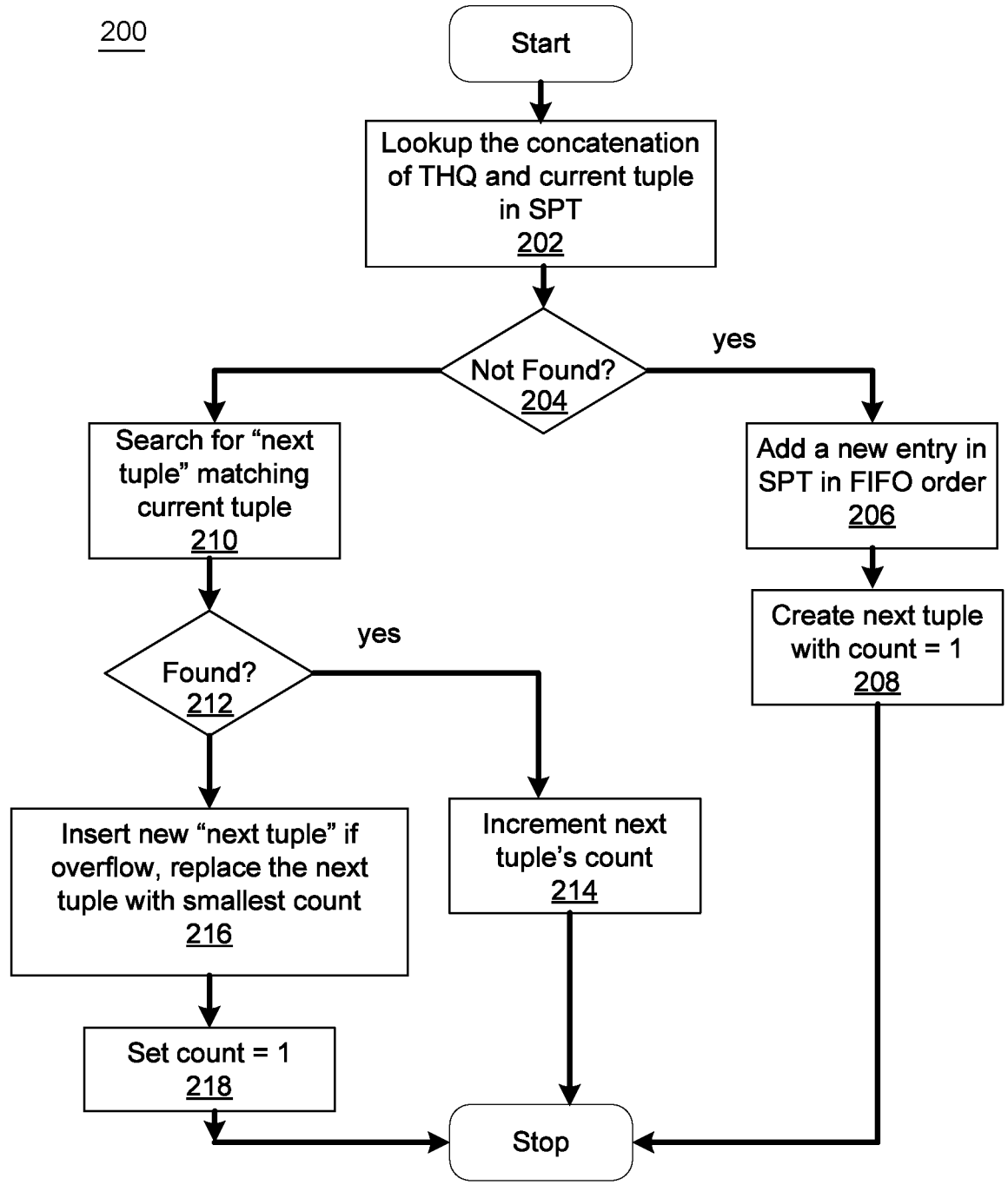
FIG. 3 is a flowchart showing the learning phase of the prefetch controller in accordance with an embodiment of the present disclosure.

Referring now to FIG. 3, operations pertaining to the learning phase of prefetch controller 108 are shown. The term "learning", as used herein, may be meant to refer to the concept of "dynamically updated learning." This type of incremental learning may be used dynamically until a saturation point is reached. That is, the learning phase may be disabled once enough information has been obtained. Once this has occurred, only the prediction phase, discussed below with reference to FIG. 4 may be needed.

As discussed above, prefetch controller 108 may be capable of acquiring information regarding the operation of system 10 during a learning phase. During the learning phase the association of sequence and instruction/stride tuple 130 may be recorded (and counted) in the Sequence Prediction Table 118. The instruction/stride tuple 130 and sequence from Tuple History Queue 116 may be fed to Sequence Prediction Table 118 (202). At this point, the entry matching the input sequence may be searched in Sequence Prediction Table 118. If no entry is found (204), a new entry may be created, holding the input sequence, and one next tuple may be created (having a count=1) (208). The entry may then be inserted into Sequence Prediction Table 118 in a First-In/First-Out (FIFO) manner (206). If the entry is found (212), then the corresponding next tuple count may be incremented (214). If the next tuple doesn't exist, a new one may be created having a count of 1 (216, 218). If the maximum number of next tuple is exceeded, one tuple may be dropped, such as the tuple having the lowest count value.

Figure 4:
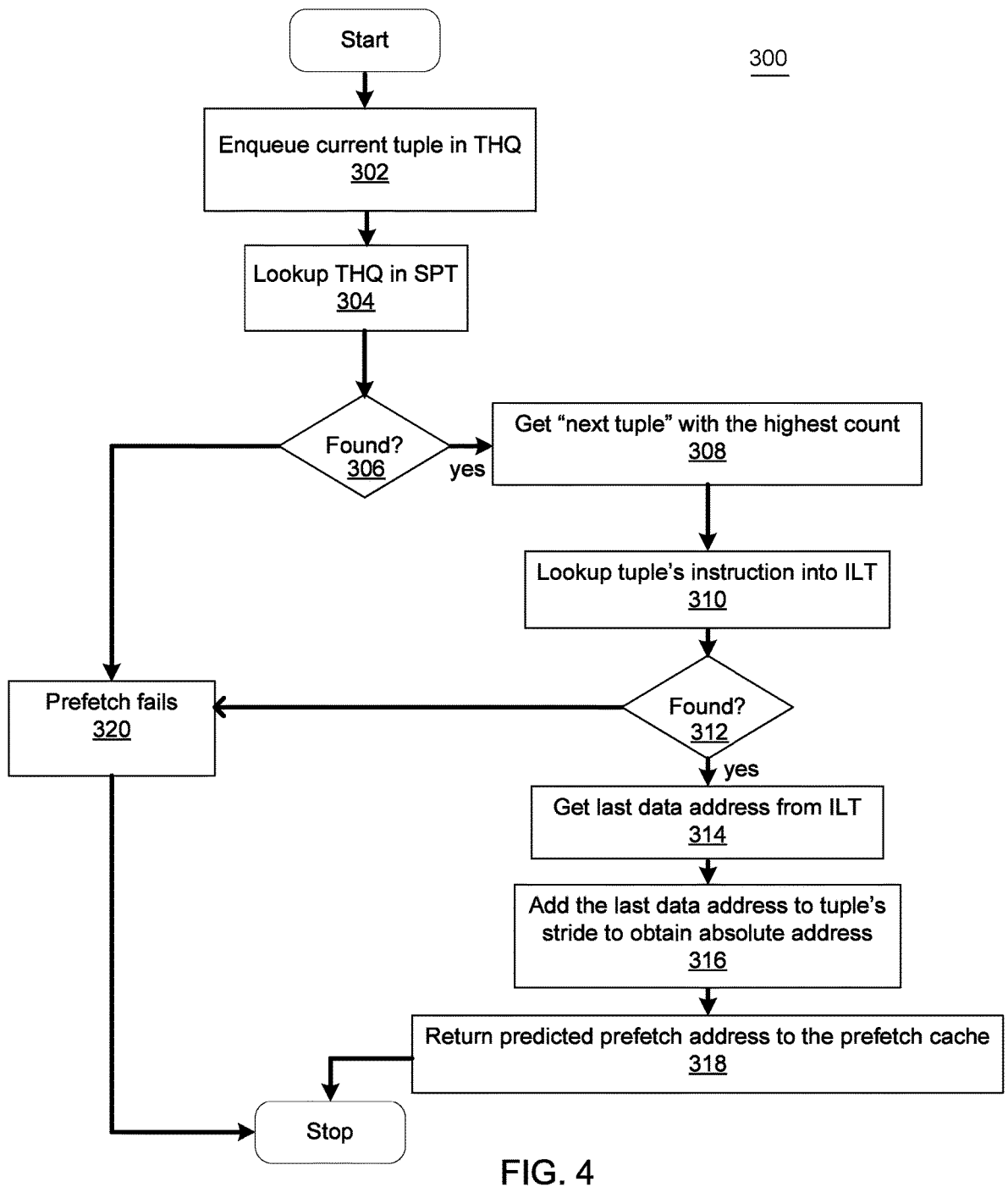
FIG. 4 is a flowchart showing the prediction phase of the prefetch controller in accordance with an embodiment of the present disclosure.

Referring now to FIG. 4, prefetch controller 108 may be capable of predicting a future request from processor 102 during a prediction phase, which is described in further detail hereinbelow. During the prediction phase, prefetch controller 108 may be configured to update Tuple History Queue 116, i.e., the current tuple may be enqueued into Tuple History Queue 116, removing the oldest tuple (302). Then the new sequence may be searched in the Sequence Prediction Table 118 (304). If an entry matches (306), the corresponding next tuple having the highest count may be returned (308). For the purposes of the present disclosure, the returned tuple is referred to as the 'predicted tuple'.

Prefetch controller 108 may then convert the stride data address of the predicted tuple into an absolute address. This conversion may occur by looking up the tuple's instruction ID in Instruction Lookup Table (ILT) 114 (310), getting the last data address (for that instruction) (314), and finally adding it to the tuple's stride using adder 120 (316). The predicted prefetch address may then be sent to prefetch cache 110 (318). At this point, LI data cache 104 may be capable of obtaining data from prefetch cache 110.

In some embodiments, prefetch cache 110 may treat the prefetch request as a normal cache read request without returning data. If data misses, a prefetch cache fill cycle may proceed. Alternatively, if data hits no prefetch may be performed. Prefetch subsystem 112 may operate to reduce the write miss penalty for L1 data cache 104. In some embodiments, a write miss may generally involve (depending on L1 cache write policy) fetching the missed line from memory 106. Prefetch subsystem 112 may observe the read operation and learn the access behavior. Upon a subsequent write miss, prefetch cache 110 may hold the missed block, readily supplying it to L1 data cache 104, avoiding any possible memory access penalty.

In some embodiments, sequence prediction table (SPT) 118 may utilize a variety of different searching methods, as such, any search method may be used in accordance with the present disclosure. A search method capable of adhering to a set of speed constraints may be of particular benefit. FIGS. 5A-5C set forth the execution time for various prefetching operations.

Figure 5:
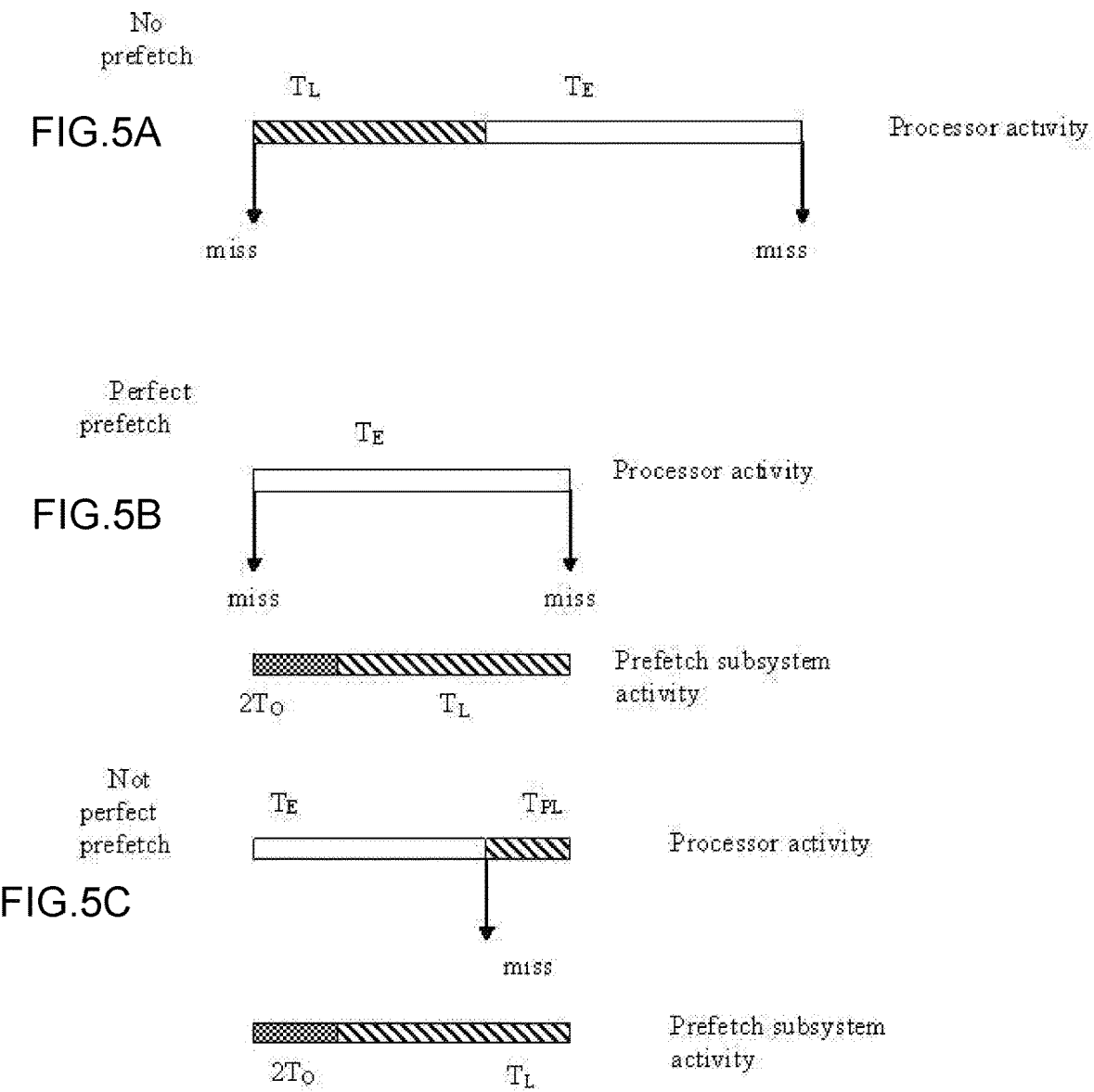
FIGS. 5A, 5B and 5C are diagrams showing possible execution and latency times associated with the prefetching described in some of the embodiments of the present disclosure.

Referring now to FIG. 5 A, a diagram showing the execution time between two successive L1 data cache misses is provided. In this example, when a miss occurs, the processor may stall for an average of $T_L$ cycles waiting for memory 106, then it executes for $T_E$ cycles. As FIG. 5B shows, perfect prefetching may then eliminate $T_L$—This may be achieved by providing the missed data from[1] prefetch cache 110, and prefetching the next miss. However, the prefetched data needs to arrive at prefetch cache 110 before the next miss. Thus, if the search time is $T_0$ then:

$$2T_0 + T_L < T_E \quad \text{(Equation 1)}$$

Where $T_0$ is the overhead time, $T_L$ is the latency time, and $T_E$ is the execution time. Here, we need 2To as two searches may be performed per one miss. One search for learning and the other for prediction. After 2To time the prefetch address for the next miss may be ready. When issuing the prefetch, memory may respond after $T_L$ cycles.

In this way, the $T_E$ time (in cycles) may be represented as:

$$T_E = CPI_{n0\ miss} \times \text{average number of instructions between misses} \quad \text{(Equation 2)}$$

Where $CPI_{n0}$ miss is the average number of cycles per instruction assuming no cache misses. Observe that:

$$\text{average number of instructions between misses} = \frac{\text{total number of instructions}}{\text{number of misses}} \quad \text{(Equation 3)}$$

and that:

$$\text{number of misses} = \text{total number of instructions} \times \text{ratio of memory access instructions} \times \text{cache miss ratio} \quad \text{(Equation 4)}$$

Hence:

$$T_E = \frac{CPI_{no\ miss}}{\text{ratio of memory access instruction} \times \text{miss ratio}} \quad \text{(Equation 5)}$$

And thus we require:

$$T_O \leq \frac{1}{2}\left(\frac{CPI_{no\ miss}}{\text{ratio of memory access instruction} \times \text{miss ratio}} - T_L\right) \quad \text{(Equation 6)}$$

For example, if the memory access instructions and miss ratios are 0.5 and 0.01 respectively, the memory latency is 100 cycles and the $CPI_{no}$ miss is 1, then $T_0$ should be smaller than 50 cycles for optimal speedup. Note that setting To larger than 50 cycles may still improve performance (but not optimal) as long as the entire prefetch process takes less time than the time the next miss would have arrived without prefetching. In other words:

$$2T_0 + T_L < T_E + T_L \quad \text{(Equation 7)}$$

Which means:

$$T_O < \frac{T_E}{2} \quad \text{(Equation 8)}$$

$$T_O < \frac{CPI_{no\ miss}}{2 \times \text{ratio of memory access instruction} \times \text{cache miss ratio}} \quad \text{(Equation 9)}$$

FIG. 5C illustrates an example showing timing behavior when a cache miss occurs. In this example, the processors may stall for an average of perceived latency ($T_{PL}$), allowing for the earlier scheduled prefetched data to arrive.

More generally, the speedup of the prefetch system may be set to:

$$s = \frac{\text{time between misses without using prefetching}}{\text{time between misses using prefetching}} \quad \text{(Equation 10)}$$

Where time between misses without using prefetching=$T_E+T_L$

If the prefetch is perfect then the time between misses using prefetching=$T_E$, and the memory latency may be completely hidden. However, if the prefetch is not perfect then the time between misses using prefetching=$2T_0+T_L$. Thus:

$$\text{time between misses using prefetching} = \max(T_E, 2T_0 + T_L) \quad \text{(Equation 11)}$$

So the overall speedup may be given by:

$$s = \frac{T_E + T_L}{\max(T_E, 2T_O + T_L)} \quad \text{(Equation 12)}$$

In some embodiments, instead of only prefetching the predicted tuple, we may fetch the two hottest tuples (i.e., tuples having the highest count values). For each of the hottest tuples, we may prefetch their next two hottest tuples. This may significantly improve performance. Experimental results using this methodology have shown an increase in speed of as much as 177%. This assumes a memory latency of 100 cycles, a fully associative sequence prediction table search, and L1 data cache miss reduction up to 99%.

In some embodiments, an alternative search implementation for the sequence prediction table may be employed. For example, a set associative technology may be used, such as those used in hardware implementation of caches. This particular embodiment may utilize a sequence prediction table organized similar to a traditional 2-way set associative cache. See, John L. Hennessy, David Patterson, *Computer Organization and Design: The Hardware/Software Interface*. Third Edition, Morgan Kaufmann, 2007. The cache may perform the search at two steps: direct mapping the sought sequence into the corresponding set, and searching all entries inside that particular set, matching the sought sequence (associative search).

This may be implemented in accordance with the present disclosure by defining an index for the tuples. For the oldest tuple of the sought sequence; the tuple's instruction address may be concatenated with the least significant bits of the tuple's stride. This type of mapping arrangement may yield uniform mapping over the cache sets. The associative search step may be performed in a manner similar to that of set associative caches.

Figure 6:
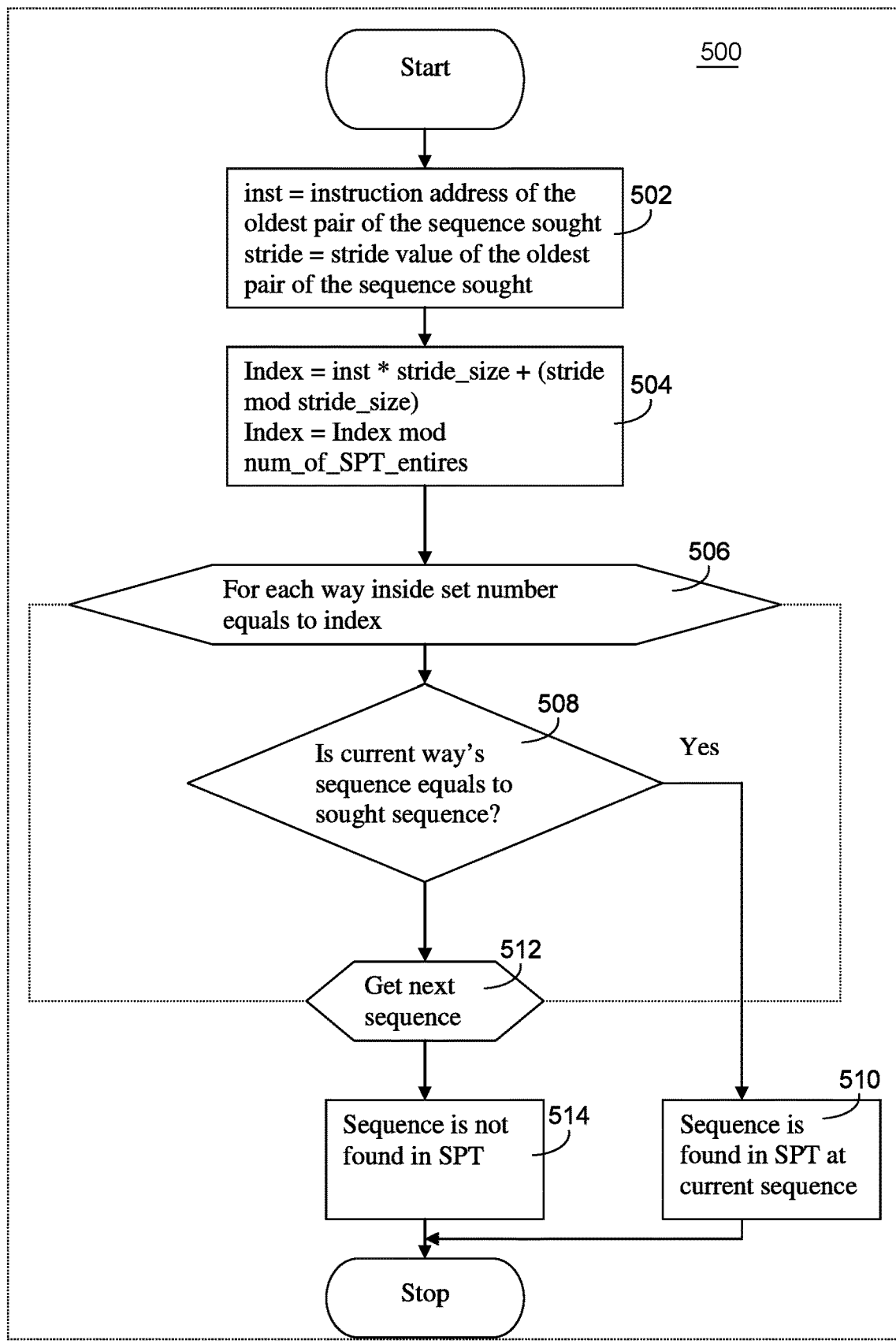
FIG. 6 is a diagram showing an associative search methodology in accordance with an embodiment of the present disclosure.

Referring now to FIG. 6, these operations are shown in greater detail in FIG. 6. Operations may include defining: Inst=instruction address of the oldest pair of the sequence sought and Stride=stride value of the oldest pair of the sequence sought (502). Operations may also include defining: Index=inst*stridesize+(stride mod stridesize) and Index=Index mod numofSPTentries (504). Operations may also include, for each way inside, set number equal to index and determining if the current way's sequence equals the sought sequence (506, 508). If so, the sequence may be found in SPT at the current sequence (510). If not, the next sequence may be obtained (512) a determination regarding the location of the sequence may be made (514). Experimental results show an overall speedup up to 133% (assuming memory latency of 100 cycles), and a miss reduction up to 97% for a two-way implementation.

Figure 7:
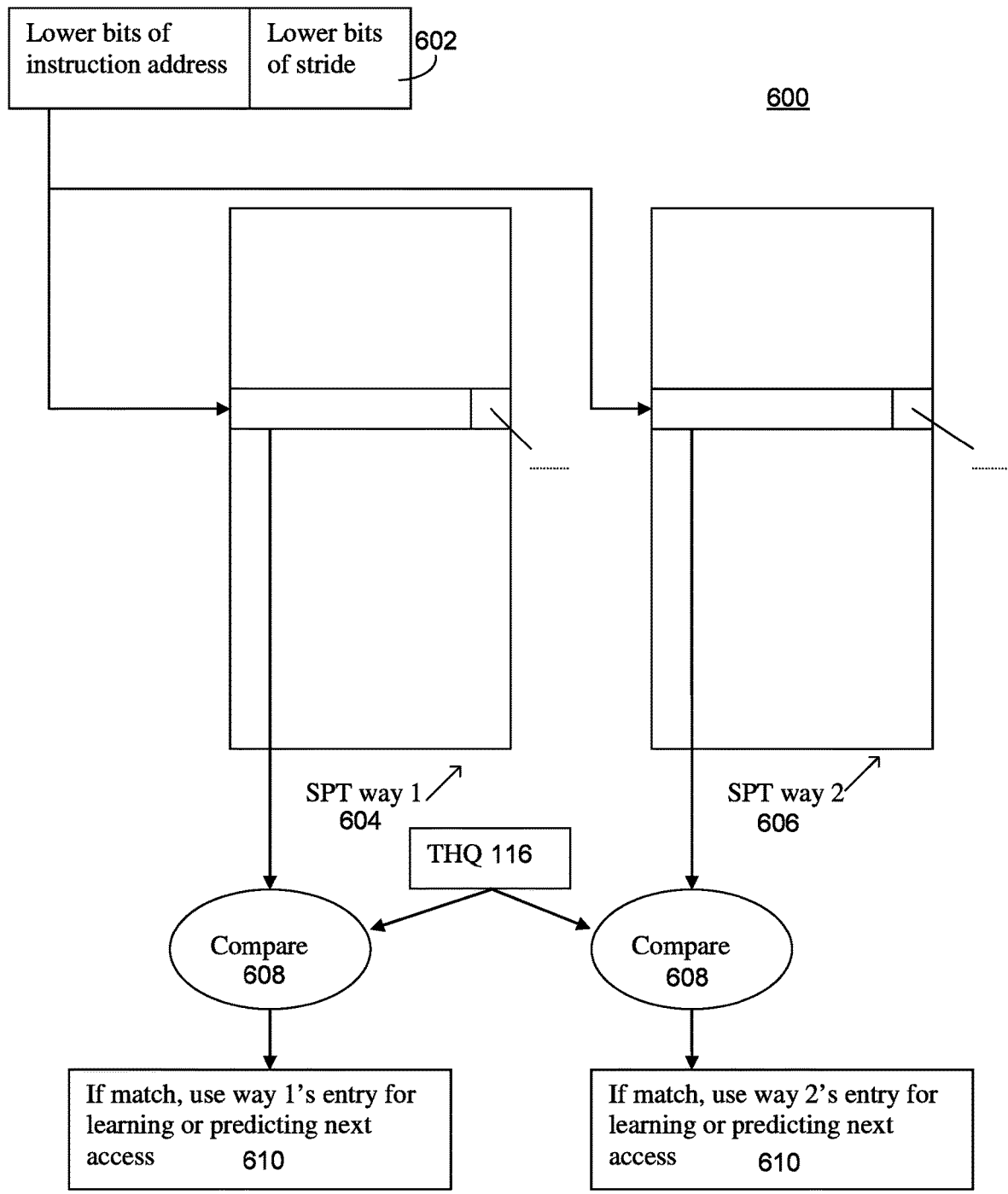
FIG. 7 is a diagram showing a two-way set associative organization of the sequence prediction table in accordance with an embodiment of the present disclosure.

Referring now to FIG. 7, one possible embodiment of a two-way organization of SPT 118 is shown. In this embodiment, the current tuple may be used to construct an index (set number). This may then be used to index each SPT way separately. The lower bits of the instruction address and the stride 602 may each be inserted within SPT way 1 604 and SPT way 2 606 respectively. The corresponding entries of each SPT may be compared 608 with those contained within tuple history queue 116. The matched entry may then be used as described above 610. This approach may save search time and increase the overall speed of system 10.

For example, suppose that THQ 116 contains the following sequence:

(100,3) (130,0) (150, 1) (100, 2)

Suppose that we have a two-way SPT table. And suppose that stridesize=32, and that the num_of_SPT_entries=1024. In order to lookup the above sequence the following may be defined:

1. inst=100
2. stride=3 mod 32=3
3. index=100*32+3=3203
4. index=3203 mod 1024=131

Now, suppose that at entry 131 we have the following two sequences at the two ways:

1: (4, 3) (10,0) (40, 2) (6,1)
2: (100, 3) (130, 0) (150, 1) (100, 2)

The first sequence may be compared with the sought sequence, i.e., is the sequence (4, 3) (10, 0) (40, 2) (6, 1) equal to (100, 3) (130, 0) (150, 1) (100, 2)? If the answer is no, then the next sequence may be compared. Thus, is the sequence (100, 3) (130,0) (150, 1) (100, 2) equal to (100, 3) (130,0) (150, 1) (100, 2). The answer is yes, so the search is successful.

In some embodiments, prefetch controller 108 may be capable of reversing the order of the learning and prediction phases. In this embodiment, prefetch controller 108 may perform the prediction phase and send the predicted data address to prefetch cache 110, which may proceed asynchronously with prefetch controller 108 in performing the learning phase.

Since each of the aforementioned phases performs an SPT search as their main operation, such reordering may decrease the search overhead by a factor of two (i.e., performing one search instead of two). Such an improvement may be achieved when the memory latency time ($T_L$) is greater than the search time (To), which may occur frequently due to the increasing memory/processor latency gap.

As used in any embodiment described herein, "circuitry" may comprise, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Embodiments of the methods described above may be implemented in a computer program that may be stored on a storage medium having instructions to program a system to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

The present disclosure may provide a number of advantages over existing methodologies. For example, the system and methods described herein may be used to associate an instruction with a data stride and may provide the ability to maintain the history of the last 'n' tuples to allow for more accurate prediction for future data references. In this way, this association may filter irregular continual references from other instructions and essentially couple control flow with data prediction. Moreover, the embodiments described herein may provide low maintenance overhead. In other words, the present disclosure may record strides instead of absolute data addresses, which may significantly reduce the number of transition counts to record. In addition, the present disclosure relies on a novel robust learning model that learns 'general' miss patterns. Experimental results show that the embodiments described herein may be used to remove up to 97% of the misses of various application traces, resulting in a speed increase of up to 177%. The present disclosure may not change the miss behavior of the original system, which may allow for static misses learning.

It should be noted that prefetch subsystem 112 may be implemented either in hardware or in software. For example, the present disclosure may be utilized in a system having software managed caches. While the present disclosure is generic in application, it may particularly fit multi-core processors due to their abundant on-chip and off-chip bandwidths. This type of configuration may effectively translate into large prefetch bandwidth, further hiding memory access latencies.

A number of implementations have been described. Nevertheless, it will be understood that various modifications may be made. Accordingly, other implementations are within the scope of the following claims.

What is claimed is:

1. A computer hardware system, comprising:
   a data cache;
   a prefetch controller configured to
     receive an initial tuple including an initial instruction ID and an initial missed data address,
     retrieve a last data access address,
     subtract the last data access address from the initial missed data address to generate an instruction/stride tuple,
     generate a predicted prefetch address using the instruction/stride tuple; and
   a prefetch cache configured to
     receive, from the prefetch controller, the predicted prefetch address, and
     provide, to the data cache, the predicted prefetch address.

2. The system of claim 1, wherein
the prefetch controller includes a tuple history queue (THQ) configured to receive and store the instruction/stride tuple.

3. The system of claim 2, wherein
the prefetch controller includes a sequence prediction table (SPT) configured to receive at least one of a current tuple and current sequence from the tuple history queue (THQ).

4. The system of claim 3, wherein
the prefetch controller includes an instruction lookup table (ILT) in communication with the sequence prediction table (SPT) and configured to store a last data address accessed for each tuple.

5. The system of claim 3, wherein
the sequence prediction table (SPT) is configured to search for a match for the current sequence.

6. The system of claim 5, wherein
the sequence prediction table (SPT) is configured to increment a next tuple count if the match for the current sequence is located.

7. The system of claim 4, wherein
the predicted prefetch address is generated by adding a predicted tuple having a stride data address from the sequence prediction table (SPT) with a last data address obtained from the instruction lookup table (ILT).

8. A computer-implemented method, comprising:
receiving, by a prefetch controller, an initial tuple including an initial instruction ID and an initial missed data address;
retrieving, by the prefetch controller, a last data access address;
subtracting, by the prefetch controller, the last data access address from the initial missed data address to generate an instruction/stride tuple;
generating, by the prefetch controller, a predicted prefetch address using the instruction/stride tuple;
receiving, by a prefetch cache and from the prefetch controller, the predicted prefetch address, and
providing, to the data cache and by the prefect cache, the predicted prefetch address.

9. The method of claim 8, wherein
the prefetch controller includes a tuple history queue (THQ) configured to receive and store the instruction/stride tuple.

10. The method of claim 9, wherein
the prefetch controller includes a sequence prediction table (SPT) configured to receive at least one of a current tuple and current sequence from the tuple history queue (THQ).

11. The method of claim 10, wherein
the prefetch controller includes an instruction lookup table (ILT) in communication with the sequence prediction table (SPT) and configured to store a last data address accessed for each tuple.

12. The method of claim 10, wherein
the sequence prediction table (SPT) is configured to search for a match for the current sequence.

13. The method of claim 12, wherein
the sequence prediction table (SPT) is configured to increment a next tuple count if the match for the current sequence is located.

14. The method of claim 11, wherein
the predicted prefetch address is generated by adding a predicted tuple having a stride data address from the sequence prediction table (SPT) with a last data address obtained from the instruction lookup table (ILT).

15. A prefetch controller within a computer hardware system including a data cache and a prefetch cache, comprising:
   an instruction lookup table (ILT) configured to receive an initial tuple including an initial instruction ID and an initial missed data address;
   a tuple history queue (THQ) configured to receive an instruction/stride tuple generated by subtracting a last data access address from the initial missed data address;
   a sequence prediction table (SPT) in communication with the instruction lookup table (ILT) and the tuple history queue (THQ);
   an adder in communication with the instruction lookup table (ILT) and sequence prediction table (SPT) and configured to
     generate a predicted prefetch address using the instruction/stride tuple, and
     provide, to the prefetch cache, the predicted prefetch address, wherein
   the prefetch cache is configured to provide, to the data cache, the predicted prefetch address.

16. The prefetch controller of claim 15, wherein
the tuple history queue (THQ) is configured to store the instruction/stride tuple and provide access for the sequence prediction table (SPT).

17. The prefetch controller of claim 16, wherein
the sequence prediction table (SPT) configured to receive at least one of a current tuple and current sequence from the tuple history queue (THQ).

18. The prefetch controller of claim 17, wherein
the instruction lookup table (ILT) is configured to store a last data address accessed for each tuple.

19. The prefetch controller of claim 17, wherein
the sequence prediction table (SPT) is configured to search for a match for the current sequence.

20. The prefetch controller of claim 19, wherein
the sequence prediction table (SPT) is configured to increment a next tuple count if the match for the current sequence is located.

* * * * *